United States Patent Office 2,739,175
Patented Mar. 20, 1956

2,739,175

PREVENTION OF CAKING OF BENZENE HEXACHLORIDE

John W. Brodhacker, United States Navy, assignor to Commercial Solvents Corporation, Terre Haute, Ind., a corporation of Maryland No Drawing. Application October 11, 1951, Serial No. 250,950

1 Claim. (Cl. 260—648)

This invention relates to a method for preventing caking of benzene hexachloride in storage, and more particularly relates to a process whereby benzene hexachloride is agitated during cooling to accelerate crystallization, as more particularly described hereinafter.

In commercial operations benzene hexachloride is generally manufactured by the direct addition of chlorine to benzene in the presence of actinic light, usually supplied by mercury vapor arcs or incandescent lamps. Both batch and continuous methods are in use. The batch method involves the gradual addition of liquid or gaseous chlorine to a mass of benzene in a jacketed, agitated, glass-lined kettle. Chlorine addition is continued as the reaction proceeds, the rate of addition being dependent upon the temperature, light source, etc. Beyond about a 12% solution of benzene hexachloride in benzene, precipitation starts, and the amount of reaction allowed to take place depends upon the flowability and handleability of the slurry so formed. About 50–60% of the benzene may be converted at temperatures close to the boiling point of benzene, but only about 30% at lower temperatures. After completion of the reaction, the chlorine is shut off and the mixture washed with water to remove the small amount of hydrogen chloride formed in the substitution reaction. The unreacted benzene is then distilled off. The mixture of molten benzene hexachloride isomers is then removed, cooled to solidify and packaged.

In continuous methods, the chlorine and benzene are fed continuously into an irradiated reaction tube at such a rate that the reaction is virtually completed in one pass. The solution is then washed and evaporated, and the molten benzene hexachloride removed continuously.

In either the batch or continuous methods the benzene hexachlorides remaining after removal of benzene are at a temperature of about 100° C. The melting point of such a mixture of benzene hexachloride isomers is about 100 to 115° C., but solidification does not occur because the mixture supercools. The molten material is further cooled by any conventional procedure, including the use of a so-called "flaker," an internally cooled drum rotating while partially submerged in a batch or stream of the molten mixture. A layer of the molten material adheres to the drum, is cooled by indirect heat exchange and solidifies. The solid flakes are scraped off the drum before making a complete revolution, and are then packaged. Such an operation effects cooling to about 60° C., the solid benzene hexachloride then being pliable and only partially crystalline. The benzene hexachloride is packaged in this condition since it had been found by prior investigators that further cooling does not bring about appreciable additional crystallization in a reasonable and practical amount of time.

Benzene hexachloride packaged in accordance with the above procedure often cakes so badly in storage as to render it difficult if not impossible, to empty the containers. On caking, virtually all the benzene hexachloride forms into a single hard mass.

I have now discovered a method for treating the solid, partially crystallized benzene hexachloride prior to packaging whereby the disadvantages of the prior art are completely obviated. Entirely unexpected results of my new method lie in the increased bulk density of the product and in the increase in the rate of crystallization of the product over that obtained when benzene hexachloride is produced by the methods of the prior art.

In accordance with the method comprising my invention the solid, partially crystallized benzene hexachloride, produced by either a batch or a continuous method, is submitted to a tumbling action during crystallization. While any convenient method of imparting the tumbling action is suitable for the operation of my process, I have found that, due to the pliability of the solid benzene hexachloride, it is best effected by placing the material in a rotating drum. By the use of such equipment the benzene hexachloride is subjected to a rolling and tumbling action, which prevents caking of the mass and in addition, changes the character of the product from pliable flakes to small, discrete particles, a greater proportion of the mass of which is crystalline.

I have found that the tumbling operation should be conducted with the entering temperature of the flakes to the tumbler below about 80° C. since at higher temperatures the benzene hexachloride tends to ball up in large undesirable spherical masses of the order of 6 inches in diameter. The usual temperature of benzene hexachloride coming from a "flaker" as discussed above is about 60° C. and I have found this to be quite satisfactory.

The operation and details of my new method are further illustrated by reference to the following specific example. This experiment involved filling a concrete mixer (a Rex Concrete Mixer manufactured by the Chain Belt Company, Milwaukee, Wisconsin, size: 4½ cubic yards, Model: AH 257N) with 4400 pounds of benzene hexachloride flakes directly from a flaker used in plant production of benzene hexachloride. The mixer was then rotated during the entire operation. In this manner, the benzene hexachloride was allowed to cool with agitation, and after cooling to 25° C. it was withdrawn from the mixer and packaged. Conditions of the run and the results of storage tests with samples taken at various intervals are shown in Table I, below.

TABLE I

| Package No. | Description when Packaged | Results after 14-day Storage Period |
|---|---|---|
| 55518 | Control Flakes from flaker | Difficult to remove from package. Large, hard lumps. |
| 55569 | From mixer after ½ hour. Temperature, 40° C. | Broke out of package by tapping lightly. Large fragile lumps. |
| 55570 | From mixer after 3½ hours. Temperature, 32° C. | Broke out with own weight when package inverted. Large but very fragile lumps. |
| 55568 | From mixer after 9½ hours. Temperature, 26° C. | Broke out with own weight when package inverted. Small lumps. |
| 55571 | From mixer after 13 hours. Temperature, 25° C. | Flowed out of package when only partly up-ended. Free flowing. |

The benzene hexachloride remaining in the mixer for thirteen hours (package No. 55571) exhibited a complete change in physical form from the benzene hexachloride flakes which were charged to the agitator. The flakes were caused to ball up into hard pebbles that had the general shape and size of smooth alluvial gravel. In this form, the benzene hexachloride was free flowing and relatively free of fine dust. The pebbles ranged in size from about 0.3 mm. to 20 mm. in diameter. A sieve analysis of the material is given in Table II.

TABLE II

*Sieve analysis of BHC from package 55571*

| U. S. Standard Series Sieve No. | Accumulative Percent Retained |
|---|---|
| 4 | 15.6 |
| 6 | 26.1 |
| 8 | 34.4 |
| 10 | 37.5 |
| 20 | 75.5 |
| 30 | 92.1 |
| 50 | 99.2 |
| 60 | 99.4 |

The pebbles or pellets formed in this experiment were found to have a bulk density of 62.7 lbs./cu. ft. or 8.40 lbs./gal. Normal benzene hexachloride flakes have a bulk density of 40.5 lbs./cu. ft. or 5.41 lbs./gal.

In another experiment, a laboratory size ball mill without the stones was charged with fresh benzene hexachloride directly from a flaker used in plant production. The ball mill was then rotated around its horizontal axis imparting a rolling action to the charge. At intervals small samples were withdrawn, ground in a mortar and distributed on a slide with a few drops of mineral oil. The slides were then examined under a petrographic microscope so that the crystalline particles could be distinguished from the non-crystalline. In this manner the amount of material estimated to be crystalline was compared with an untumbled control which came from the flaker at the same time. The results are shown in Table III.

TABLE III

| Hours from Flaker | Crystalline BHC in Control, percent | Crystalline BHC in tumbled sample, percent |
|---|---|---|
| 6 | 25 | 40 |
| 24 | 35 | 50 |
| 96 | 50 | 80 |

Other experiments employing 150 pound batches of benzene hexachloride in a 54 gallon tumbler have indicated the benzene hexachloride to be from 75 to 85 per cent crystallized in about 2 hours.

It is to be understood that I do not wish to be limited in any manner by the procedure outlined in the general description, or in the above examples. Many variations or equivalents of my process will readily occur to those skilled in the art, and it is understood that such variations or equivalents are also included within the scope of my invention. In particular, it is obvious that my invention could be employed as part of a continuous process wherein warm, pliable benzene hexachloride is fed to one end of a rotating drum and cooled granules continuously removed from the other end.

I claim:

A method for preparing non-caking benzene hexachloride from molten, supercooled benzene hexachloride, having a temperature between about 80 and 100° C., which comprises cooling said benzene hexachloride to about 60° C. to solidify, placing said solidified benzene hexachloride in a rotatably mounted horizontal cylinder, rotating said cylinder until ambient temperatures are approached, and removing the pellets of benzene hexachloride from said cylinder.

References Cited in the file of this patent

UNITED STATES PATENTS

| | | |
|---|---|---|
| 441,951 | Goetz | Dec. 2, 1890 |
| 1,908,979 | Herbst | May 16, 1933 |
| 2,120,540 | Billings et al. | June 14, 1938 |
| 2,564,406 | Neher et al. | Aug. 14, 1951 |
| 2,585,898 | Kauer | Feb. 12, 1952 |